US005486293A

United States Patent [19]
Boschetti et al.

[11] Patent Number: 5,486,293
[45] Date of Patent: Jan. 23, 1996

[54] REMOVAL OF SMALL EXOGENOUS MOLECULES FROM BIOLOGICAL FLUIDS

[75] Inventors: Egisto Boschetti, Croissy; Pierre Girot, Paris; Luc P. Guerrier, Chilly-Mazarin, all of France

[73] Assignee: Hemasure, Inc., Marlborough, Mass.

[21] Appl. No.: 215,201

[22] Filed: Mar. 21, 1994

[51] Int. Cl.$^6$ .......................... B01D 15/00; B01D 15/08
[52] U.S. Cl. .......................... 210/635; 210/656; 530/413; 530/417
[58] Field of Search .................... 210/635, 644, 210/645, 650, 656; 422/101; 436/177, 178; 530/413, 414, 416, 417

[56] References Cited

U.S. PATENT DOCUMENTS

| | | | |
|---|---|---|---|
| 4,481,189 | 11/1984 | Prince . | |
| 4,540,573 | 9/1985 | Neurath et al. | 514/2 |
| 4,615,886 | 10/1986 | Purcell et al. | 514/2 |
| 4,720,385 | 1/1988 | Lembach | 424/86 |
| 4,764,369 | 8/1988 | Neurath et al. | 424/89 |
| 4,841,023 | 6/1989 | Horowitz | 530/351 |
| 4,857,514 | 8/1989 | Lippa et al. | 514/78 |
| 4,939,176 | 7/1990 | Seng et al. | 514/724 |
| 5,053,135 | 10/1991 | Boschetti et al. | 210/635 |
| 5,151,499 | 9/1992 | Kameyama et al. | 530/381 |
| 5,186,945 | 2/1993 | Shanbrom | 424/529 |
| 5,204,324 | 4/1993 | Shanbrom | 514/2 |
| 5,268,097 | 12/1993 | Girot et al. | 210/198 |

FOREIGN PATENT DOCUMENTS 0239859 of 1987 European Pat. Off. .

OTHER PUBLICATIONS

Prince et al. "Inactivation of Hepatitis B and Hutchinson Strain Non–A, Non–B Hepatitis Viruses . . . " *Vox Sang* 46, 36–43 (1984).
Prince et al. "Quantitative Assays for Evaluation of HTLV–III Inactivation . . . " *Cancer Research* 45, 4592s–4594s (1985).
Prince et al. "Sterilisation of Hepatitis and HTLV–III Viruses by Exposure to . . . " *The Lancet*, Mar. 29, 1986, pp. 706–709.
Horowitz et al. "Inactivation of viruses in labile blood derivatives" *Transfusion* 25, 516–522 (1985).
Edwards et al. "Tri (n–Butyl) Phosphate/Detergent Treatment of Licensed Therapeutic . . . " *Vox Sang* 52, 53–59 (1987).
Horowitz et al. "Inactivation of Lipid–Enveloped Viruses in Labile Blood Derivatives . . . " *Vox Sang* 54, 14–20 (1988).
Horowitz et al. "Solvent/Detergent–Treated Plasma: A Virus–Inactivated Substitute . . . " *Blood* 79, 3, 826–831 (1992).
DiPaolantonio, et al. "Low Risk of Transmission of the Human Immunodeficiency . . . " *J. Med. Virology* 36, 71–74 (1992).
Piquet et al. "Virus Inactivation of Fresh Frozen Plasma by a Solvent Detergent Procedure: . . . " *Vox Sang* 63, 251–256 (1992).
Michalski et al. "Large–Scale Production and Properties of a Solvent–Detergent–Treated . . . " *Vox Sang* 55, 202–210 (1988).
Strancar et al. "Extraction of Triton X–100 and its determination in virus–inactivated . . . " *J. Chrom. A. 658*, 475–481 (1994).
L. Guerrier et al., Journal of Chromatography B: Biomedical Applications, 664, pp. 119–125 (1995).

*Primary Examiner*—John Kim
*Attorney, Agent, or Firm*—Heslin & Rothenberg

[57] ABSTRACT

Novel sorbents and methods for removing small hydrophobic and amphophilic molecules from biological fluids were disclosed. The methods and materials were particularly useful for removing viral inactivating agents from blood and blood fractions. The novel sorbents comprise a porous mineral oxide matrix having its interior porous volume substantially filled with a crosslinked hydrophobic polymer network.

16 Claims, 1 Drawing Sheet

REMOVAL OF SMALL EXOGENOUS MOLECULES FROM BIOLOGICAL FLUIDS

FIELD OF THE INVENTION

The invention relates to a method and materials for removing small exogenous molecules such as viral inactivating agents from biological fluids such as blood and blood fractions.

BACKGROUND OF THE INVENTION

Numerous attempts have been made to inactivate viruses such as Hepatitis B (HB), non-A, non-B Hepatitis (NANBH), Human T Lymphotrophic Retrovirus Type 3 (HTLV), Human Immunodeficiency Virus (HIV), and Lymphadenopathy Associated Virus (LAV). At present, the method of choice for inactivating these viruses in blood and blood fractions is treatment with a solvent such as tri-n-butyl phosphate and a detergent such as polysorbate 80 (Tween 80) or sodium cholate. Much of the early work in this area was done by the group of Bernard Horowitz and Alfred Prince at the New York Blood Center and as of February 1991, over 1.7 million doses of solvent and detergent treated coagulation factor concentrates had been infused.

In addition to tri-n-butyl phosphate, other phosphate esters, ether and halohydrocarbons have been described as useful solvents. In addition to polysorbate or sodium cholate detergents, other nonionic surfactants, particularly ethoxylated octylphenols and nonylphenols, as well as sulfobetaines, phosphatidyl cholines and octyl β-D-glucopyranoside have been mentioned as viral inactivating agents. For example, U.S. Pat. No. 4,540,573 describes the use of a number of organic solvent and detergent pairs to reduce the infectivity of hepatitis and other viruses.

In all of the foregoing treatments, exogenous agents are added to the biological fluid. In most cases, these exogenous agents must be removed from the biological fluid before it can be administered to a human. European application 239,859 describes a method that is currently employed to remove lipid soluble process chemicals from biological fluids. It comprises bringing the fluid into contact with a naturally occurring oil, agitating the resultant mixture, separating the phases by sedimentation or centrifugation, decanting the upper lipid phase, and utilizing the residual biological fluid. Aside from the mechanical complexity of this process, it appears applicable only to the removal of lipid soluble process chemicals (such as tri-n-butyl phosphate). Indeed the application indicates that a common non-ionic surfactant (polysorbate 80) is poorly extracted.

Gel filtration has also been proposed for removing detergents and solvents from blood fractions based on molecular weight differences. Horowitz et al. [*Tranfusion*, 25, p. 516–522 (1985)] have described the removal of tri-n-butyl phosphate from anti-hemophilic factor concentrates by chromatography on Sephadex G-25; however, gel chromatography is not a practical method for removing solvent and detergent from whole blood. Moreover, it was ineffective for the removal of polysorbate 80 from a blood component, although effective for removing sodium cholate. Horowitz et al. [*Blood*, 79, p. 826–831(1992)] have also suggested the removal of tri-n-butyl phosphate and Triton® X-100 (polyethoxylated octylphenol) from fresh frozen plasma by extraction with soybean oil, centrifugation, and then preparative chromatography on C-18 reverse phase.

None of the methods presently in use or proposed is particularly attractive for the routine processing of blood and blood fractions. There is thus a need for a simple and effective method for removing small exogenous molecules, both hydrophobic and polar, from blood and other biological fluids.

It is therefore an object of the present invention to provide a method for removing small exogenous molecules from a biological fluid quickly and efficiently.

It is another object of the invention to provide a method that can remove exogenous molecules without impairing the function of the biological fluid.

It is a further object to provide a method for removing exogenous molecules that can remove both hydrophobic and amphiphilic molecules.

It is a more particular object of the present invention to provide a method for removing viral inactivating agents from blood or blood fractions quickly and efficiently in a clinical setting.

It is a further object of the invention to provide a porous support suitable for removing small exogenous molecules without impairing the function of the biological fluid.

These and other objects, features and advantages are provided by the instant invention summarized below.

SUMMARY OF THE INVENTION

In one aspect, the invention relates to a method for removing contaminants from a biological fluid. The method comprises bringing the fluid into contact with a cross-linked hydrophobic polymer network which fills the pores of a mineral oxide matrix. The cross-linked polymer network overlays the porous mineral oxide and fills the interior porous volume but is not covalently bound thereto. Hydrophobic and amphiphilic molecules of molecular weight below 10,000 Daltons are simultaneously removed from the biological fluid as it passes over the mineral oxide supported hydrophobic polymer network.

In particular, the method may be used for removing solvents and surfactants from biological fluids. Preferred biological fluids include blood, blood fractions and biological extracts from which viral inactivating agents may be removed.

Preferred mineral oxide matrices have initial average particle sizes of about 5 to about 2,000 microns, porous volumes from about 0.2 to about 4 cubic centimeters per gram, surface areas from about 1 to about 1000 square meters per gram and initial pore sizes from about 50 to about 6,000 angstroms. Most preferably the mineral oxide matrix has an initial porous volume of about 1 cubic centimeter per gram and an initial surface area of about 200 square meters per gram.

The cross-linked hydrophobic polymer may be selected from the group consisting of acrylates, methacrylates, acrylamides, methacrylamides and mixtures thereof. Preferred hydrophobic polymers are alkyl and arylalkyl acrylamides and methacrylamides of 4 to 20 carbons, and alkyl and arylalkyl acrylates and methacrylates of 4 to 20 carbons. When the method is to be used to remove viral inactivating agents from blood and blood fractions, particularly preferred polymers are N-tert-octyl acrylamides, N-octadecyl acrylamide, N-methylundecyl acrylamide, and octadecyl methacrylate.

The method of the invention is particularly well suited to removing up to 5% by weight of one or more viral inactivating agents selected from the group consisting of detergents and hydrophobic solvents. The method is particularly useful for removing a phosphate ester such as tri-n-butyl phosphate, a detergent such as an ethoxylated nonylphenol or octylphenol nonionic surfactant, or a combination of solvent and detergent.

In another aspect the invention relates to a porous support for removing small exogenous molecules from biological fluids. The support comprises a porous mineral oxide matrix which has interior pore volume substantially filled by a cross-linked hydrophobic polymer. The hydrophobic polymer overlays but is not covalently bound to the mineral oxide matrix. The hydrophobic polymer has an exclusion limit of about 10 kilodaltons. Preferred matrices and hydrophobic polymers are as described above for the method using the porous support.

DETAILED DESCRIPTION OF THE INVENTION INCLUDING PREFERRED EMBODIMENTS

Figure 1:
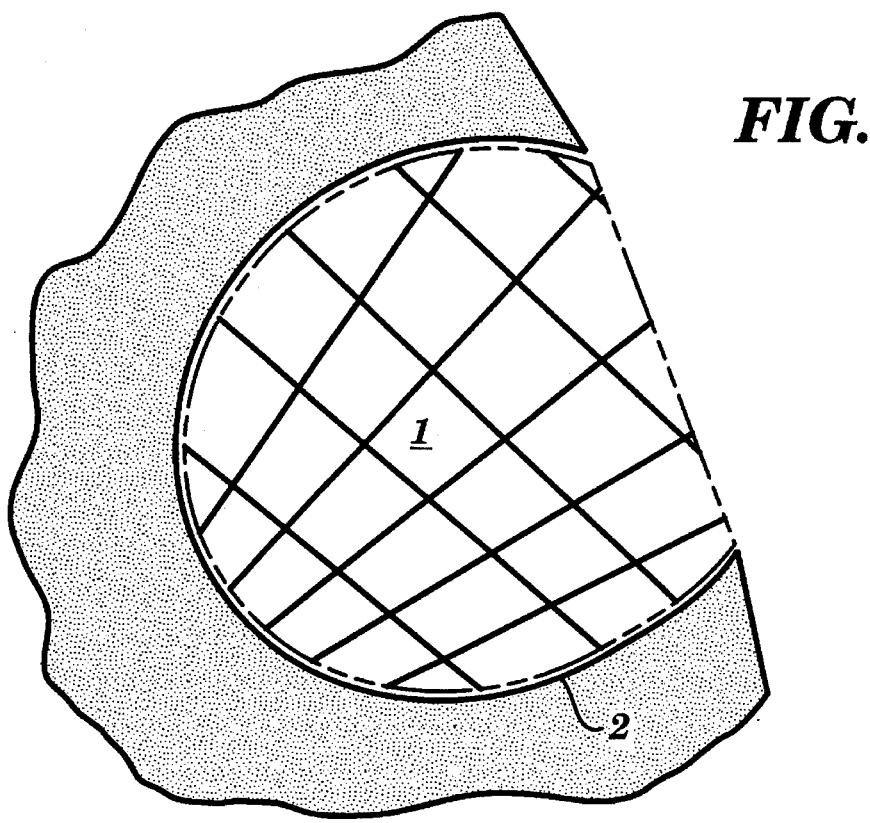
FIG. 1 is a schematic illustration of the putative architecture of the three-dimensional polymer network formed within and extending from the internal surfaces of an individual pore in a porous solid matrix according to the present invention.

The present invention relates to the synthesis of a special solid sorbent with a specific internal chemical structure that is able to selectively absorb small hydrophobic molecules or amphiphilic molecules, such as detergents, that have a significant hydrophobic domain and a polar domain. The sorbents comprised of two main components: (1) a rigid porous mineral material which may be capable of forming hydrogen bonds with the polar domain of amphiphilic molecules such as detergents and (2) an organic hydrophobic network within which non-polar solvents can be effectively retained. The organic hydrophobic network is highly crosslinked so that detergents, solvents and other contaminants smaller than 10,000 dalton are easily captured inside the microporous structure while proteins and cellular components slip around the particles and do not interact with the sorbent.

The sorbents of the invention allow an in-line process for the removal of hydrophobic molecules with higher throughput than is possible with oil extraction technology. The method has the additional advantage that no waste solvents are produced whereas oil extraction produces a solvent enriched oil that must be regenerated or disposed of. In addition, contamination of the biological fluid by the purification medium is avoided, whereas in the case of oil extraction the oil is likely to be adsorbed in traces by the hydrophobic proteins in the biological fluid.

The sorbents of the invention provide a number of advantages over gel filtration as well. Sample loading is a limiting factor in gel filtration. Commonly, the volume of load cannot be higher than 25% of column volume, so that a ten liter column is needed to treat about 2.5 liters of biological fluid. In contrast, a ten liter column of the sorbent of the invention could be used to treat as much as 100 liters of biological fluid. The linear flow rate of such a gel filtration column is limited to less than centimeters per hour because of the mechanical instability of the gel and the band broadening that occurs with higher linear velocities; by contrast the particles of the invention allow high flow rates.

The polymer filled mineral oxide sorbents of the invention show very high chemical and physical stability and are relatively unaffected by solvents, strongly acidic aqueous media, strongly alkaline media, and oxidizing agents.

Chemical and physical stability are important characteristics of a material that is to be reused a number of times and that must therefore be cleaned and regenerated. In particular, it is important that regeneration conditions not give rise to degradation products that would either impair the original properties of the sorbent or introduce contaminants into the biological fluid. In respect to stability, the sorbent of the invention provides a number of advantages over existing methodologies for the removal of solvents and detergents from biological fluids.

Chemical stability and sorption capacity are the primary drawbacks of reverse phase chromatography on C-18 silica for the removal lipid solvents. The C-18 solid phase cannot be used above pH 8 because of chemical degradation of the substrate. Moreover, C-18 reverse phase sorbents are notorious for their non-specific adsorption of lipophilic proteins from biological fluids.

The pores of the mineral oxide sorbents of the present invention are filled with a stable crosslinked polymer which is resistant to chemical breakdown. In addition, the reversible sorption capacity is higher due to the density of lipid chains in the polymer network. While the number of octadecyl hydrocarbon chains is limited on C-18 reverse phase substrates by the number of accessible hydroxyls on the surface of silica, in the present invention, it is not so limited. Because the volume of polymer is a function of pore volume rather than pore surface area, and because the polymer is not bound to the silica, a dense network can be laid down by using a more concentrated monomer for polymerization.

The mineral component of the sorbent of the invention is characterized by a high surface area per gram in order to maximize the adsorptive capacity for detergents and similar molecules having polar domains. By the same token, the amount of organic hydrophobic polymer network is high enough to allow maximum sorption of non-polar solvents. The high crosslinking, leading to an exclusion limit below 10 kilodaltons, restricts diffusion to relatively small molecules and prevents the penetration and consequent non-specific binding of proteins.

The preparation of the sorbents of the invention is similar in some respects to the preparation of sorbents described in U.S. Pat. No. 5,268,097 which is incorporated wherein by reference. A solid porous mineral in bead form or in the form of irregular particles is impregnated with a solution of appropriate hydrophobic polymerizable monomers and bifunctional crosslinkers. After filling the pores of the mineral with monomer solution, polymerization is effected under the action of a catalyst. The crosslinked polymer is immobilized inside the porous volume of the mineral substrate by physical trapping and cannot escape even under the action of solvents.

The mineral substrate can be any metal oxide that is capable of providing a porous structure and that can be obtained in irregular or bead-shaped particles. The metal oxide may additionally possess the ability to hydrogen bond with detergents possessing polar side chains. Silica, alumina, zirconia, titania and mixtures of them are examples of useful mineral materials.

Monomers useful for preparing the immobilized crosslinked hydrophobic polymer include vinylic, acrylic, and allylic monomers. They are characterized by the presence of a hydrophobic side chain which can be aromatic, heterocyclic or aliphatic. Aliphatic side chains can be linear, branched, or cyclic. Examples of monomers include octadecyl methacrylate, hexadecyl methacrylate, dodecyl methacrylate, octyl methacrylate, octadecyl acrylamide, hexadecyl acrylamide, methylundecyl acrylamide, iso-octyl acrylamide, hexyl acrylamide, phenylpropyl acrylamide and trityl acrylamide. Exemplary vinylic, allylic and acrylic monomers correspond to the general formula I:

$$H_2C=C\begin{matrix}R^1\\R^2\end{matrix}\qquad I$$

wherein $R^1$ is hydrogen or methyl and $R^2$ is hydrogen, lower alkyl, $$-COO(CH_2)_n\underset{\underset{R^4}{|}}{\overset{\overset{R^3}{|}}{C}}-R^4$$

or $$-CO\underset{\underset{R^5}{|}}{N}-(CH_2)_n\underset{\underset{R^4}{|}}{\overset{\overset{R^3}{|}}{C}}-R^4$$

n is zero or an integer from 1 to 18;

$R^3$ is hydrogen, alkyl or aryl;

$R^4$ is hydrogen, alkyl, aryl, or heteroaryl; and $R^5$ is hydrogen or alkyl.

To prepare sorbents of the invention, a bifunctional crosslinking agent is added to the monomer. The crosslinking agent allows the three dimensional insoluble polymeric network to form within and substantially fill the pore volume of the porous matrix. In the absence of the crosslinker, the polymer formed would be linear and, because of its solubility, could be extracted from the pore by common solvents. The amount of crosslinking agent should be about 0.1% to about 10% by weight of the total weight of monomer. Crosslinking agents used in the present invention are acrylic, vinylic or allylic monomers that possess at least two polymerizable functional groups. Preferred crosslinking agents have at least two double bonds and are those classically used in making acrylic, vinylic and allylic polymers. Examples of useful crosslinking agents include, but are not limited to, N,N'-methylene-bis-acrylamide, N,N'-methylenebismethacrylamide, diallyl tartradiamide, allyl methacrylate, diallyl amine, diallyl ether, diallyl carbonate, divinyl carbonate, divinyl ether, 1,4- butanedioldivinylether, and 1,3-diallyloxy-2-propanol.

After mixing the monomer and crosslinking agent, the mixture is admixed with the porous solid matrix thereby filling the pores of the matrix. In one possible process for preparing the sorbent, the pores are filled with an aqueous solution of monomer and crosslinking agent and the mixture is placed in a non-aqueous dispersing medium. Suitable non-aqueous media include non-polar organic solvents known to those skilled in the art, for example, vegetable oils, aromatic solvents and chlorinated solvents. Preferred non-aqueous media include toluene, methylene chloride and hexane.

Thereafter a polymerization initiator is added to the mixture. Examples include amines such as N, N, N', N'-tetramethylethylenediamine (TMEDA) or dimethylaminopropionitrile that are commonly used with oxidizing initiators (see below) such as ammonium persulfate. These may also include photoactivatable compounds such as riboflavin or thermoactivatable chemicals such as azo-bis-isobutyronitile, ammonium persulfate or azo-bis-amidinopropane. The concentration of initiator is from about 0.1 to about 2%. It will be apparent to those of skill in the art that certain initiators are best dissolved in aqueous media while others are best dissolved in organic media. Hence, depending on the solubility characteristics of a particular initiator or combination of initiators, the polymerization initiator can be added to the initial solution of monomer and crosslinking agent prior to addition of that mixture to the porous solid matrix. In fact, an initiator combination of ammonium persulfate and tetramethylethylene diamine (TMEDA) can be introduced separately. The water soluble persulfate salt is combined with the aqueous mixture of monomer and crosslinking agent while the TMEDA is combined with the non-aqueous dispersing medium. It should be noted that the persulfate/TMEDA combination is particularly useful because TMEDA displays appreciable solubility in water and is thereby able to penetrate the pores of the treated support to efficiently initiate polymerization. When using the combination of persulfate and tertiary amine, the persulfate is preferably added prior to the addition of the non-aqueous medium, since persulfate is much more soluble in water than in non-aqueous dispersing media.

Figure 2:
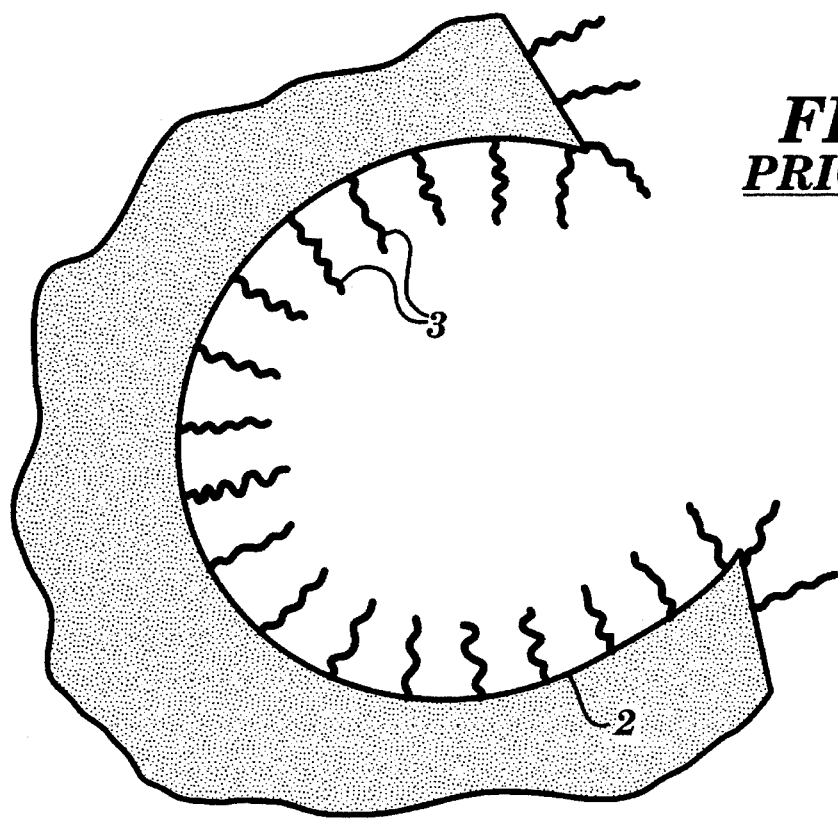
FIG. 2 is a schematic illustration of the presumed architecture of a standard octadecylsilane-coated silica matrix of the art.

The polymerization process creates a three dimensional lattice or crosslinked polymer network 1 that extends away from the pore wall surfaces 2 of the porous solid matrix as illustrated in FIG. 1. The three dimensional structural lattice substantially fills the porous volume, and is substantially identical in shape to that of the pore which it fills. This is distinguished from the structure of typical coated silica (see FIG. 2) where the aliphatic residues 3 are scattered in a monomolecular layer along the surface of the silica 2.

It has been discovered that the porous supports of the present invention exhibit unusually high dynamic sorptive capacity as a function of flow rate for the removal of hydrophobic molecules. In particular, whereas a great majority of porous materials suffer a marked decrease in sorptive capacity as flow rates increase, the supports of the present invention show little decrease in useful sorptive capacity for hydrophobic molecules from a static condition up to flow rates of several hundred cm/hr. This is in marked contradistinction to the behavior of polysaccharide gel type materials such as Sepharose. Moreover, the absolute capacity of the supports of the present invention are considerably greater than those of other types of solid supports that exhibit a similar insensitivity to high flow rate. Interestingly, the sorbents appear more like typical porous supports in respect to their behavior with detergents.

The sorbents and methods of the invention can be used to remove various small exogenous molecules from biological fluids. Biological fluids of interest include, but are not limited to, blood and blood fractions, semen, milk, ascitic fluid, saliva, placental extracts, tissue culture cell lines and their extracts including transformed cells and products of fermentation.

Of primary interest among solvents to be removed are the dialkyl phosphate and trialkyl phosphate solvents having linear or branched groups from 1 to 20 carbon atoms. Examples of this group are tri-(n-butyl)phosphate, tri-(t-butyl)phosphate, tri-(n-hexyl)phosphate, and tri-(2-ethylhexyl)phosphate. Lipophilic solvents include in addition to the phosphate esters mentioned above, halohydrocarbons and ethers, which have also been used for virus inactivation.

The media are also useful in removing detergents or surfactants of all sorts. The hydrophilic domain of the detergent can be non-ionic (e.g. polyoxyethylene chains, mono or poly hydroxylated chains, sugars, and the like), anionic (e.g. carboxylates, sulfonic acids, sulfates, phosphates or phosphonates) or cationic (e.g. ammonium salts and pyridinium salts). The hydrophobic domain of the detergent can include alkyl, aryl or heteroaryl residues. Examples of non-ionic detergents include: (a) the polyethylene oxide condensates of alkyl and dialkyl phenols, having a straight or branched alkyl of from about 6 to about 12 carbon atoms with ethylene oxide and (b) the condensation products of aliphatic alcohols with ethylene oxide of the formula RO $(C_2H_4O)_n$ wherein R is a straight or branched alkyl having from about 8 to about 22 carbon atoms and n is 3 to 40. Non-ionic surfactants of type (a) are marketed by GAF Corporation under the trademark IGEPAL™ and by Union Carbide under the trademark Triton™. Of particular interest are Triton X100 and Triton X45, which have been used to inactivate viruses in blood and blood products. Non-ionic surfactants of type (b) above are marketed by Shell Chemical Company under the trademark Neodol™ and by Union Carbide Corporation under the trademark Tergitol™. Other non-ionic surfactants include polyoxyethylenated derivatives of sorbitan monolaurate, known as polysorbates; of particular interest is polysorbate 80 which has been used to inactivate virus in blood and blood products.

Anionic surfactants of interest include sodium cholate and sodium taurodeoxycholate. Cationic surfactants include cetyltrimethylammonium bromide, cetylpyridinium chloride and dodecylpyridinium chloride. Zwitterionic surfactants include phosphatidyl choline and sulfobetaines such as N-dodecyl-N,n-dimethyl-2-amino-1-ethanesulfonate. Other non-ionic detergents include amides of tris-hydroxymethylamino methane containing alkyl chains, alkyl glycosides and other lipopolysaccharides. Other species of interest include fatty acids, such as caprylic acid, and triterpenoids, such as carbenoxolone, which have also been used to inactivate virus in blood and blood products.

The elimination of undesired exogenous chemical agents is valuable for other processes besides the removal of viral inactivating agents. For example, phorbol esters, which are well known carcinogens, were used to stimulate lymphokine production and must be removed from the product before administration. By the same token, the use of detergent is not restricted to virus inactivation; detergents used for the purification of vaccine antigens must also be removed at the end of the purification process [see *Biochem. Biophys. Acta* 415, 29 (1975)].

The invention is further illustrated by the following examples:

EXAMPLE 1

Preparation of a silica-polymer composite with medium length aliphatic hydrophobic chain.

Four grams of methylundecylacrylamide (MUA) was dissolved in 3 mL of pure ethanol at 40°–50° C. Separately, 0.4 mg of N,N'-methylene-bis-acrylamide (MBA) was dissolved in 1.5 mL of dimethylsulfoxide. The two solutions were mixed together and 0.5 mL of demineralized water containing 0.05 mg of azobis-amidinopropane was added to the solution. The total volume of the mixture was adjusted to 10 mL with pure ethanol.

The solution of monomers was added dropwise under stirring to 10 g of dry porous silica, the surface area of which was 200 $m^2/g$ and the porous volume about 1 $cm^3/g$. Under nitrogen, the impregnated silica was heated in a closed vessel at 80°–90° C. for at least two hours to begin the polymerization. The polymer-silica composite obtained was cooled overnight and then washed extensively with ethanol, 0.5M sodium hydroxide, 0.1M hydrochloric acid and finally with water.

The composite sorbent was placed in a 0.3×10 cm column and 6 mL of bovine serum treated with 5 mg/mL of TNBP and 10 mg/mL of Triton X-100 according to the method of Horowitz et al. [*Transfusion* 25, 516–522 (1985) and *Blood* 79, 826–831 (1992)] was flowed through the column. Both Triton X-100 and tri-n-butylphosphate (TNBP) were removed from the solvent/detergent virus inactivated bovine serum. The sorption capacity for Triton X-100 was about 60 mg/mL of sorbent. The sorption capacity for TNBP was greater than 43 mg/mL of sorbent.

EXAMPLE 2

Preparation of silica polymer composite with long aliphatic hydrophobic chains.

Two grams of octadecylacrylamide (ODA) was dissolved in 15 mL of dichloroethane under stirring. Separately 0.8 mg of N,N'-methylene-bis-methacrylamide (MBMA) was dissolved in 3 mL of methanol and mixed with the ODA solution. The resulting mixture, 2 mL of methanol containing 0.1 mg of azobis-isobutyronitrile, was added and mixed thoroughly. Ten milliliters of the monomer solution was added dropwise and under stirring to 10 g of dry porous silica, the surface area being about 200 $m^2/g$ and the porous volume about 1 $cm^3/g$.

Under nitrogen stream, the solvents (dichloroethane and methanol) were evaporated to constant weight. On the resulting dry material, the second half of the monomer solution (10 mL) was added dropwise as described above.

Under nitrogen, the monomer-impregnated silica was heated in a closed vessel at 80°–90° C. for at least two hours to begin the polymerization. The obtained polymer-filled silica was cooled overnight and then washed extensively with dichloroethane, methanol, 0.5M sodium hydroxide, 0.1M hydrochloric acid and finally with water. It was then stored as an ethanol suspension or dried. Bovine plasma was treated as described in Example 1. The sorption capacity for Triton X-100 was 78 mg per mL of sorbent; the sorption capacity for TNBP was greater than 45 mg/mL of sorbent. Both results were obtained in the presence of bovine plasma.

EXAMPLE 3

Preparation of polymer-filled silica with branched aliphatic hydrophobic chains.

The preparation of this material was performed as described in Example 1, except that the main monomer was tert-octylacrylamide instead of MUA and that the bifunctional cross-linker was MBMA instead of MBA.

The properties of this material when tested as in Example 1 were as follows:

Capacity for Triton X-100: 65 mg/mL of sorbent

Capacity for TNBP: >43 mg/mL of sorbent

EXAMPLE 4

Preparation of silica-polyacrylate composite material with long aliphatic chains.

The preparation of this material was performed as described in Example 2, except that the main monomer was an octadecylmethacrylate instead of octadecyl-acrylamide. The properties of this material when tested as in Example 1 were as follows:

Capacity for Triton X-100: 72 mg/mL of sorbent
Capacity for TNBP: >43 mg/mL of sorbent

EXAMPLE 5

Influence of the silica surface area on the sorption capacity for Triton X-100.

Three silica-MUA sorbents were prepared according to the methodology described in Example 1. The only variable parameter was the surface area of the porous silica. The concentration of the monomer was in all cases 40% w/v. On these three sorbents, the sorption capacity for a nonionic detergent, Triton X-100, was measured in the same conditions. This was done using bovine serum containing 1% of Triton X-100. The intrinsic sorption capacities of the sorbents were as follows:

| Silica Surface area ($m^2/g$) | Sorption capacity (mg/mL) |
| --- | --- |
| 25 | 11 |
| 75 | 22 |
| 200 | 60 |

EXAMPLE 6

Influence of the polymer concentration on the capture efficiency for TNBP.

Three silica-MUA sorbents were prepared according to the methodology described in Example 1. The only variable parameter was the concentration of MUA monomer prior to polymerization. The specific surface area and the porous volume of silica were in all cases respectively 200 $m^2/g$ and 1 $cm^3/g$.

On these three sorbents, the sorption capacity for TNBP was measured in the same conditions. This was done using bovine serum containing 0.5% of TNBP. Measuring the TNBP in the column effluents, it was possible to obtain a measure of capture efficiency of the sorbents. Results were as follows:

| Concentration of MUA (%) | Residual amount of TNBP (ppm) |
| --- | --- |
| 20 | 120–130 |
| 30 | 20–30 |
| 40 | 10–20 |

Total sorption capacity for TNBP was in all cases between 40 to 45 mg/mL.

EXAMPLE 7

Repeated depletion of solvent/detergent from a virus inactivated plasma.

A silica-MUA sorbent corresponding to the description of Example 1 was packed in a column of 0.3 cm diameter and 10 cm length. The column was equilibrated by repeated washings with a phosphate buffer physiological saline solution (PBS) at a flow rate of 0.15 mL per minute. A sample of 2.5 mL of solvent/detergent treated bovine serum (content of Triton X-100 was 1%; the content of TNBP was 0.5%) was injected into the column and collected at the column outlet. The column was then washed with 10 volumes of each following solution: PBS/ethanol 50%; ethanol; ethanol-isopropanol 50%; isopropanol; ethanol; PBS/ethanol 50%. Finally it was re-equilibrated with PBS. At this point, a second injection of solvent/detergent treated bovine serum was done in the same conditions as described above and then the column regenerated and re-equilibrated. This cycle was repeated five times. The five column effluents were analyzed and the content of Triton X-100 and of TNBP was assayed. The results obtained were as follows:

| | Initial content | | Final Content | |
| --- | --- | --- | --- | --- |
| Cycle | TNBP (mg/mL) | Triton X-100 (mg/mL) | TNBP (mg/mL) | Triton X-100 (mg/mL) |
| 1 | 5 | 10 | $12.8 \times 10^{-3}$ | 0.35 |
| 2 | 5 | 10 | $18 \times 10^{-3}$ | 0.46 |
| 3 | 5 | 10 | $8.6 \times 1^{-3}$ | 0.30 |
| 4 | 5 | 10 | $12.2 \times 10^{-3}$ | 0.36 |
| 5 | 5 | 10 | $12.9 \times 10^{-3}$ | 0.37 |

EXAMPLE 8

Solvent/detergent elimination from a solution of immunoglobulins G.

To 10 mL of 10 mg/mL of human immunoglobulins G (IgG) in 0.15M phosphate buffered saline at physiological pH, 0.05 mL of TNBP and 0.1 mL of Triton X-100 were added. The mixture was classically treated under gentle agitation at 27° C. for 4 hours. Two and one-half milliliters of this solution were passed through a 0.7×10 cm column of silica-MUA-sorbent; the flow rate was 0.15 mL/minute. The IgG effluent was recovered and analyzed to quantify the residual amount of solvent and detergent. Results were as follows:

| | Amount of chemicals | |
| --- | --- | --- |
| | TNBP (mg/mL) | Triton X-100 (mg/mL) |
| Before depletion | 5 | 10 |
| After depletion | undetectable (or <0.4 ppm) | undetectable |
| Removal efficiency (%) | 100% | 100% |

EXAMPLE 9

Solvent/detergent elimination from a whole human inactivated plasma.

To 10 mL of human plasma 0.05 mL of TNBP and 0.1 mL of Triton X-100 were added. This biological fluid was then treated as described in Example 8. The results of the treatment are indicated in the table below.

| | Amount of chemicals in plasma | |
| --- | --- | --- |
| | TNBP | Triton X-100 |
| Before treatment | 5 mg/mL | 10 mg/mL |
| After treatment | 3.8 ppm | 342 ppm |
| Removal efficiency | 99.92% | 96.58% |

EXAMPLE 10

Influence of flow rate on the solvent/detergent depletion from a biological fluid.

This experiment was done under the same conditions as described in Example 8. Four experiments were done in parallel in order to check the influence of flow rate on the solvent/detergent depletion efficiency. Results were as follows:

| | Depletion efficiency (%) | | | | | |
|---|---|---|---|---|---|---|
| | TNBP | | | TRITON | | |
| Flow Rate (mL/min) | Before (Mg/mL) | After (mg/mL) × $10^{-3}$ | Removal efficiency (%) | Before (mg/mL) | After (mg/mL) | Removal efficiency (%) |
| 0.15 | 5 | 3.8 | 99.924 | 10 mg/mL | 0.34 | 95.2 |
| 0.3 | 5 | 3.6 | 99.928 | 10 mg/mL | 0.94 | 84.0 |
| 0.6 | 5 | 10.6 | 99.788 | 10 mg/mL | 1.72 | 62.0 |
| 1.2 | 5 | 31.0 | 99.380 | 10 mg/mL | 2.20 | 51.0 |
| 2.4 | 5 | 48.0 | 99.040 | 10 mg/mL | 2.50 | 39.0 |

While the invention has been particularly shown and described with reference to preferred embodiments thereof, it will be understood by those skilled in the art that other changes in form and details may be made therein without departing from the spirit and scope of the invention.

We claim:

1. A method for removing contaminants from a biological fluid comprising bringing said biological fluid into contact with a cross-linked hydrophobic polymer network overlaying, but not covalently bound to a porous mineral oxide matrix, said mineral oxide matrix having interior porous volume substantially filled by said hydrophobic polymer network, said mineral oxide matrix having interior porous volume free or hydrophilic polymers, whereby hydrophobic and amphiphilic molecules of molecular weight below 10,000 daltons are simultaneously removed from said biological fluid.

2. A method according to claim 1 for removing solvents and surfactants from a biological fluid comprising bringing said biological fluid into contact with a cross-linked hydrophobic polymer network overlaying, but not covalently bound to, a porous mineral oxide matrix whereby said solvents and surfactants are removed from said fluid.

3. A method according to claim 2 wherein said biological fluid is blood, a blood fraction, or a biological extract.

4. A method according to claim 1 wherein said mineral oxide matrix has an initial average particle size of about 1 to about 2000 microns, an initial porous volume from about 0.2 to about 4 cm$^3$/g, an initial surface area from about 1 to about 1000 m$^2$/g, and an initial pore size from about 50 to about 6000 Angstroms.

5. A method according to claim 4 wherein said mineral oxide matrix has an initial porous volume of about 1 cm$^3$/g and an initial surface area of about 200 m$^2$/g.

6. A method according to claim 1 wherein said hydrophobic polymer is selected from the group consisting of acrylates, methacrylates, acrylamides, methacrylamides and mixtures thereof.

7. A method according to claim 6 wherein said hydrophobic polymer is selected from the group consisting of N-alkyl and N-arylalkylacrylamides and methacrylamides of 4 to 20 carbons.

8. A method according to claim 6 wherein said hydrophobic polymer is selected from the group consisting of alkyl and arylalkyl acrylates and methacrylates of 4 to 20 carbons.

9. A method according to claim 1 for removing viral inactivating agents from blood or a blood fraction comprising bringing said blood into contact with a cross-linked hydrophobic polymer chosen from the group consisting of acrylates, methacrylates, acrylamides, methacrylamides and mixtures thereof.

10. A method according to claim 9 wherein said hydrophobic polymer is selected from the group consisting of N-alkyl and N-arylalkylacrylamides and methacrylamides of 4 to 20 carbons.

11. A method according to claim 10 wherein said hydrophobic polymer is selected from the group consisting of N-tert-octylacrylamide, N-octadecylacrylamide, and N-methylundecylacrylamide.

12. A method according to claim 9 wherein said hydrophobic polymer is selected from the group consisting of alkyl and arylalkyl acrylates and methacrylates of 4 to 20 carbons.

13. A method according to claim 12 wherein said hydrophobic polymer is octadecyl methacrylate.

14. A method according to claim 9 wherein said blood contains up to 5% of one or more viral inactivating agents selected from the group consisting of detergents and hydrophobic solvents.

15. A method according to claim 14 wherein said viral inactivating agent is a phosphate ester, a detergent, or a combination of the two.

16. A method according to claim 15 wherein said viral inactivating agent is a combination of tri-n-butylphosphate and an ethoxylated alkylphenol nonionic surfactant.

* * * * *